UNITED STATES PATENT OFFICE 2,580,825

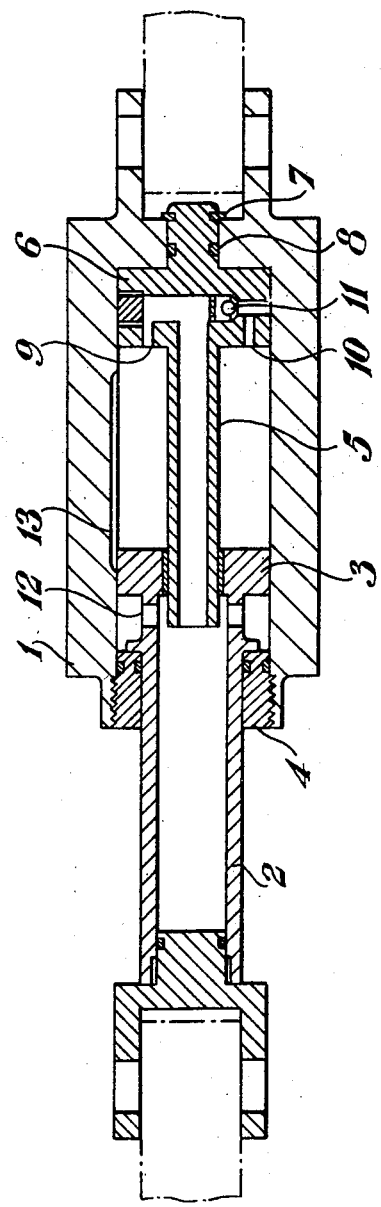

SHOCK ABSORBING MEANS

George Orloff, Cheltenham, England, assignor to Electro-Hydraulics Limited, Warrington, England, a company of Great Britain Application February 25, 1948, Serial No. 10,875
In Great Britain April 29, 1946

Section 1, Public Law 690, August 8, 1946
Patent expires April 29, 1966

5 Claims. (Cl. 267—64)

This invention relates to shock absorbing means, such as may be utilised for example in the suspension of vehicles such as aircraft or land vehicles.

According to the present invention shock absorbing means comprises a liquid pressure cylinder full with a compressible liquid, a piston and a liquid flow restriction or damping device within said cylinder and capable of relative movement, the arrangement being such that on such relative movement caused by external load liquid is compressed and caused to flow, with dissipation of energy, through the damping device from one side of the piston to the other, the piston and damping device regaining their relative normal positions under the action of the thus strained liquid.

In order to vary damping characteristics, during relative movement between the piston and damping device, the bore of the cylinder may be grooved or slotted to provide for a certain amount of liquid flow from one side of the piston to the other over a limited proportion of its travel.

Preferably the liquid flow restriction or damping device comprises a diaphragm fixed within the cylinder in substantially liquid-tight relationship and having a tubular member extending therefrom over which the piston can slide.

One form of construction according to this invention is illustrated in the accompanying drawing showing the shock absorbing means in longitudinal section. Referring to the drawing, shock absorbing means comprises a liquid pressure cylinder 1 hydraulically full with a liquid and formed at one end to receive an attachment pin. Within the cylinder is a sliding assembly comprising a hollow piston rod 2 provided with a liquid-tight attachment and terminating in a piston head 3, the assembly being retained inside the cylinder by a liquid-tight retaining nut 4. Also secured within the cylinder is a damping or liquid flow restriction device comprising a hollow tube 5 terminating in a head 6 retained inside the cylinder by means of a circlip 7 and rendered substantially pressure-tight by fit or by packing 8. The head is in the form of a diaphragm provided with two ducts 9, 10 which effect the means of damping, one or both of said ducts being capable of being sealed during movement of the shock absorbing means by a ball valve or valves 11 so as to effect the required degree of damping in each direction. The hollow tube 5 passes through the piston head 3 and communicates with the piston rod 2 which is provided with one or more passages 12 communicating with the cylinder 1 on the under side of the piston head and allowing passage of liquid without any appreciable restriction. The piston assembly and damping device are capable of relative movement, the piston 3 being slidable on the hollow tube 5 of the damping device. The inner surface of the cylinder may be provided with one or more grooves or slots as at 13 over a portion of the length of the cylinder and so arranged that on relative movement of the piston assembly and damping device a certain amount of liquid may pass through the groove or slot 13 depending upon the position of the piston head relative thereto in order to vary the damping characteristics of the shock absorbing means.

The shock absorbing means function in the following manner: during closure, liquid contained in the cylinder and hollow piston rod is compressed by the volume displaced by the piston rod 2, and liquid from one side of the piston head passes through the restriction ducts or orifices 9, 10 in the damping device into the spaces provided by the bore of the tube 5 thereof, the hollow piston rod 2, and the annular space on the under side of the piston head 3. The flow of liquid is accompanied by dissipation of energy and when the shock absorbing means extends under the influence of the thus strained liquid, liquid passes from these spaces, through the damping device to the space above the piston. Both during compression and extension a certain amount of liquid may pass in addition through the slot or groove 13 in the bore of the cylinder, if this is provided. The passage provided by this groove may vary in area according to the displacement of the piston head in the cylinder.

What I claim is:

1. In a shock absorbing mechanism, means including a cylinder defining a first pressure chamber and a second pressure chamber; a damping device including duct means interposed between said chambers for restricting the flow of liquid from said first chamber to said second chamber; means including a piston mounted for movement in said cylinder relatively to said damping device for decreasing the volume of said first chamber while simultaneously increasing the volume of said second chamber; means for sealing the system constituted by said chambers and said duct means against escape of liquid or entrance of fluid; and compressible liquid completely filling said system whereby application of an external load moves said piston and effects compressing of the liquid in said first chamber and flow of said compressed liquid through said damping device from said first chamber to said second chamber with consequent dissipation of energy and also storing of energy in the compressed liquid capable of restoring the piston to its normal position when the external load is removed, said damping device constituting the sole means of communication between said chambers during at least the first part of the piston stroke caused by application of the external load.

2. Shock absorbing means as claimed in claim 1 in which in order to vary damping characteristics during relative movement between the piston and the damping device, there is provided in the cylinder bore a liquid flow passage in the form of a groove to provide a certain amount of liquid flow from one side of the piston to the other over a limited portion of its travel.

3. Shock absorbing means as claimed in claim 1 in which the liquid flow restriction damping device comprises a diaphragm fixed within the cylinder in substantially liquid-tight relationship and having a tubular member extending therefrom over which the piston can slide.

4. Shock absorbing means as claimed in claim 1 in which the liquid flow restriction damping device comprises a diaphragm fixed within the cylinder in substantially liquid-tight relationship and having a tubular member extending therefrom over which the piston can slide, and a liquid flow passage in the form of a slot in the cylinder bore which passage provides for a certain amount of liquid flow from one side of the piston to the other over a limited portion of its travel.

5. Mechanism as set forth in claim 1 in which said piston has differential areas subjected respectively to the pressure of liquid in said first and second chambers, the larger piston area being subjected to the pressure of liquid in said first chamber.

GEORGE ORLOFF.

REFERENCES CITED

The following references are of record in the file of this patent:

UNITED STATES PATENTS

| Number | Name | Date |
|---|---|---|
| 2,039,135 | Waugh | Apr. 28, 1936 |
| 2,064,527 | Ericsson | Dec. 15, 1936 |
| 2,443,587 | Tack | June 15, 1948 |